Oct. 13, 1925. 1,557,427
R. CONRADER
MOTOR LOAD CONTROLLING DEVICE
Filed Dec. 1, 1921 4 Sheets-Sheet 4
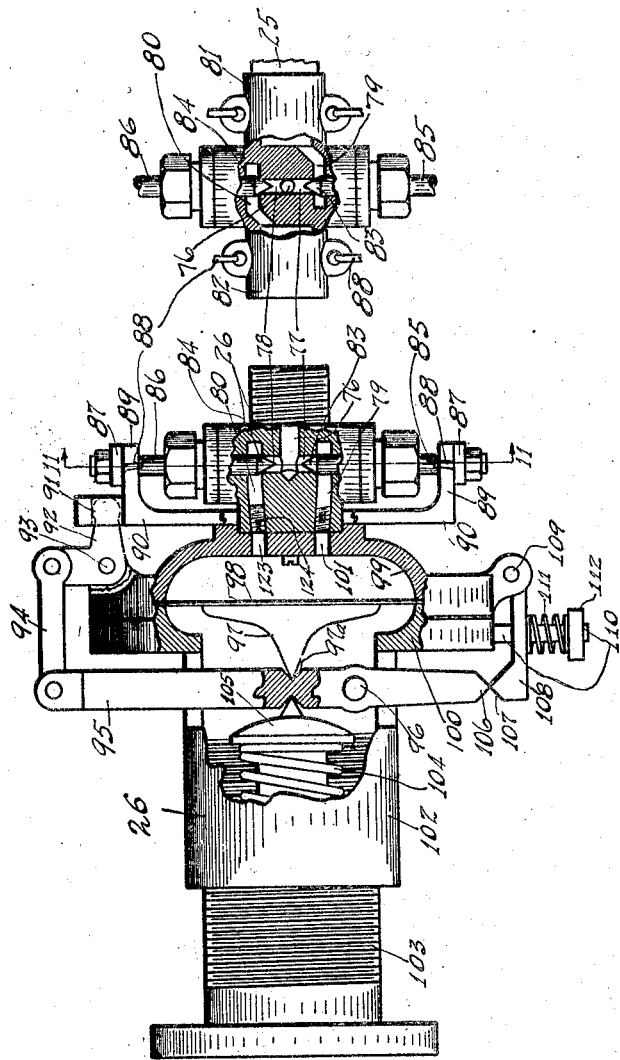

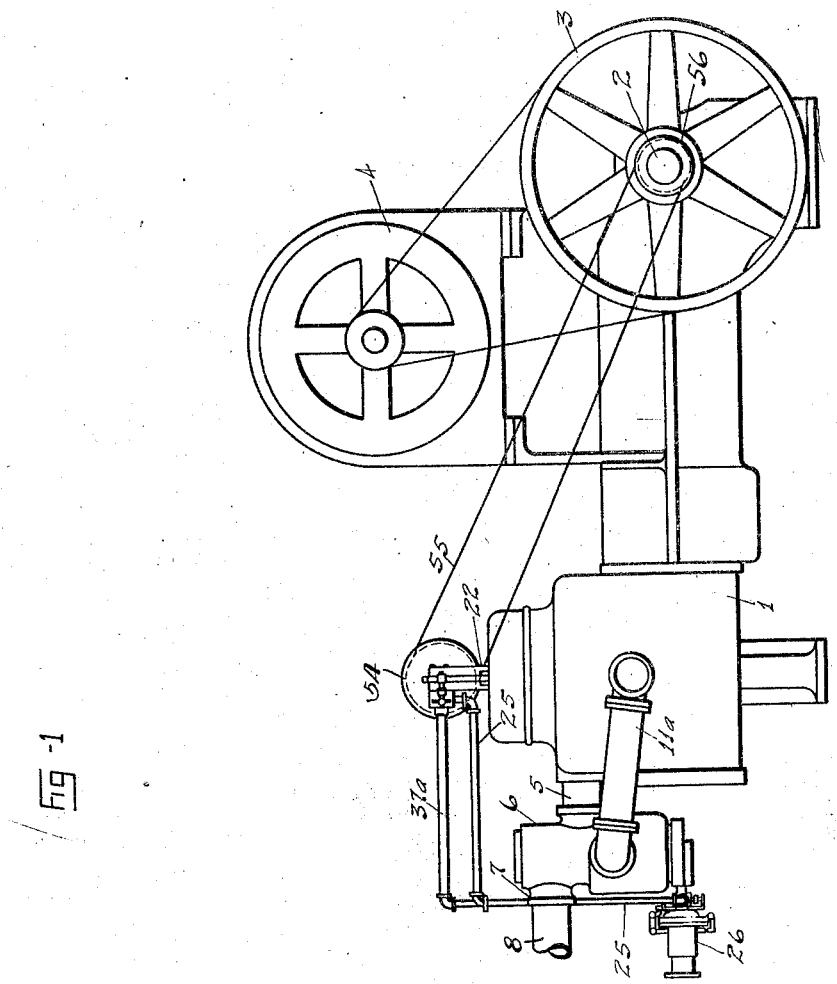

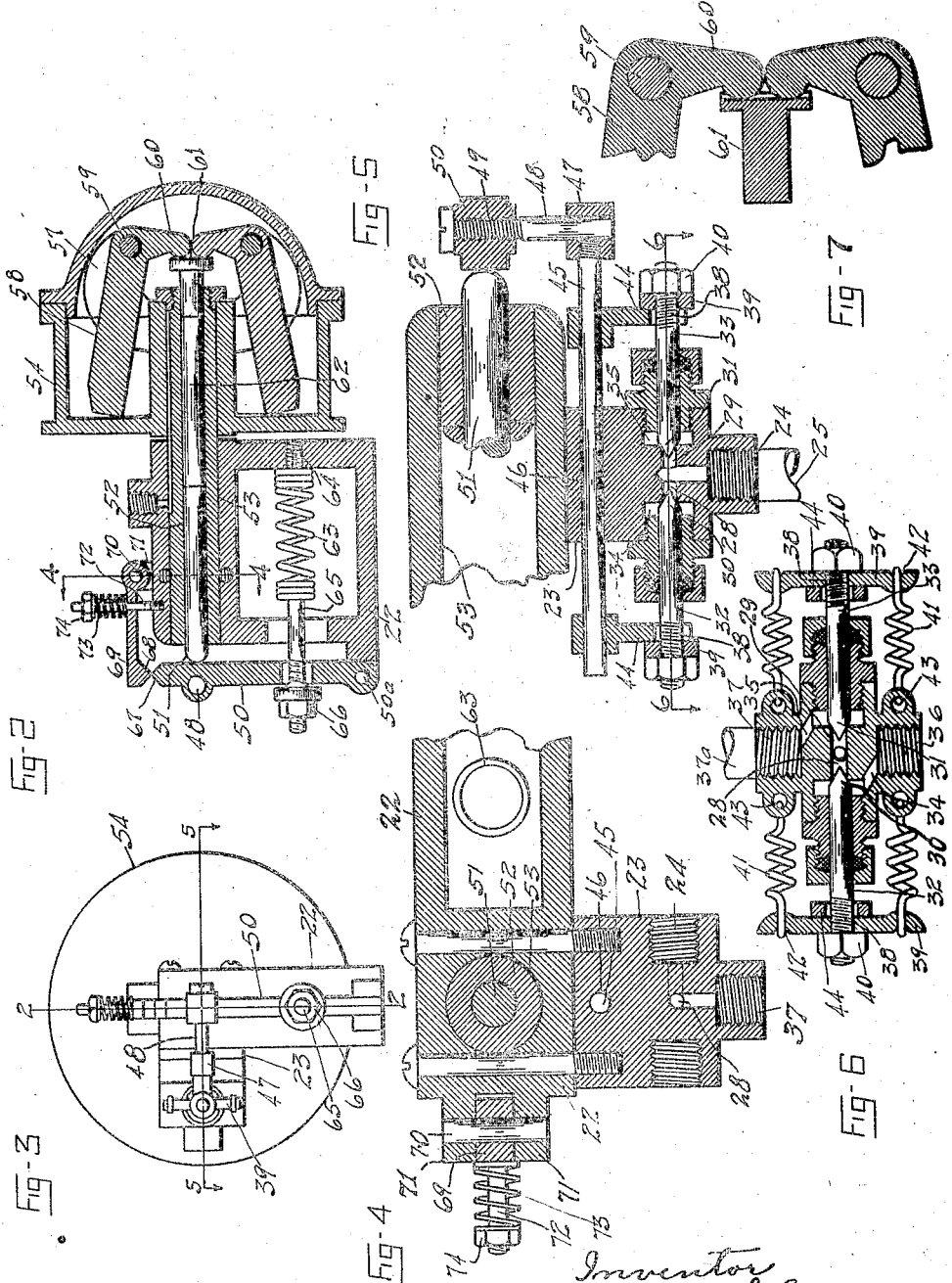

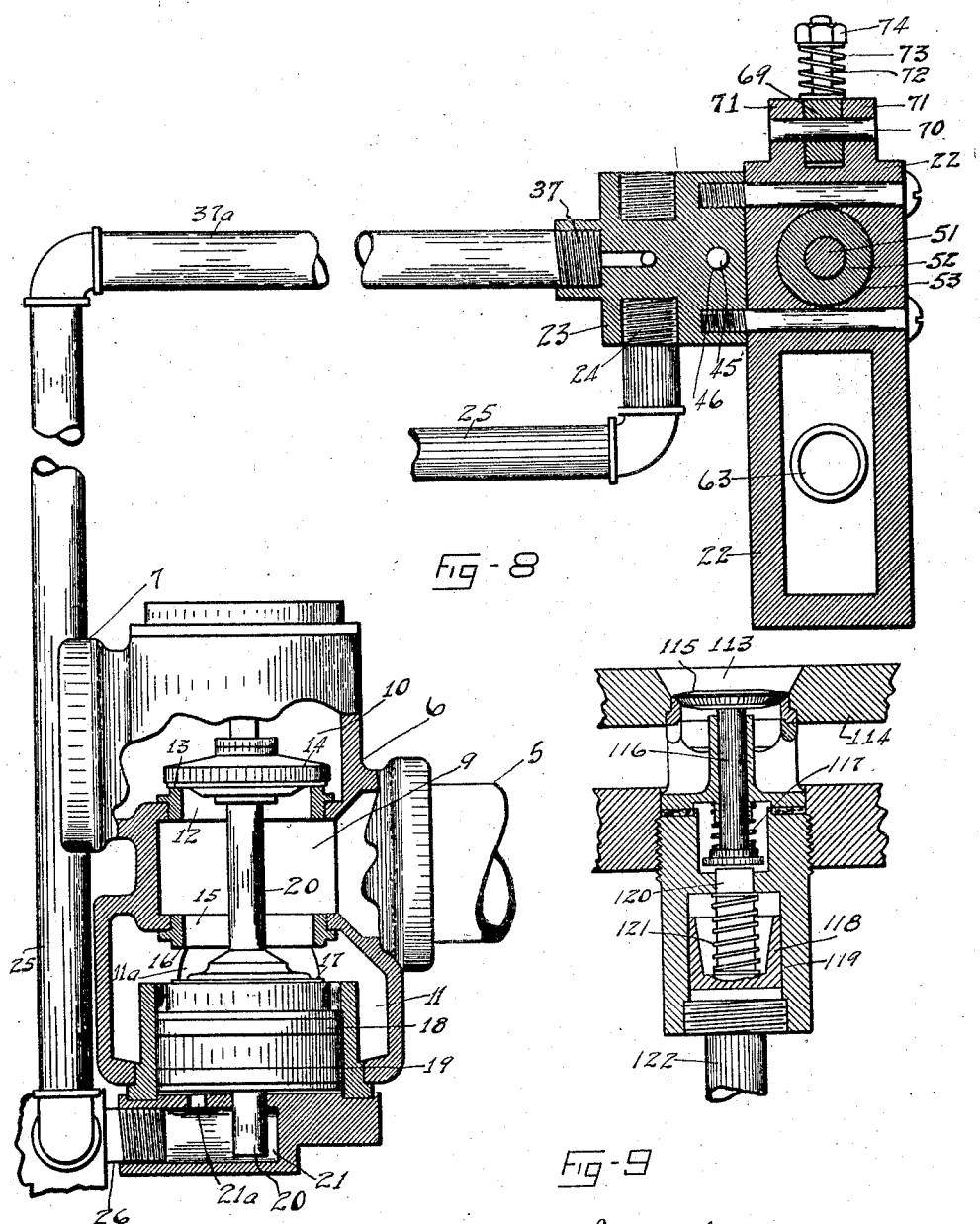

Patented Oct. 13, 1925.

1,557,427

UNITED STATES PATENT OFFICE.

RUDOLPH CONRADER, OF ERIE, PENNSYLVANIA.

MOTOR LOAD-CONTROLLING DEVICE.

Application filed December 1, 1921. Serial No. 519,165.

*To all whom it may concern:*

Be it known that I, RUDOLPH CONRADER, a citizen of the United States, residing at Erie, in the county of Erie and State of Pennsylvania, have invented new and useful Improvements in Motor-Load-Controlling Devices, of which the following is a specification.

This device is designed to automatically facilitate the starting of driven mechanisms, such as pumps, where the motor used for driving the pump is incapable or subjected to undue strain if the mechanism is started under full load prior to the time the motor is up to speed. Where this device is used with a pump this is accomplished by unloading the pump until the speed reaches a certain point when the unloader is actuated by a speed sensitive device so as to throw the load on the pump. Preferably the device is supplied also with a regulator for the unloader which will operate in response to differences of pressure independently of the speed, that is to say, after the motor has gotten up to speed and so far as the speed sensitive device is concerned the load is placed on the pump, the pump may be unloaded successfully by the unloader as the pressure demands require without interference from the speed sensitive device. Other features of the invention will appear from the specification and claims.

The invention is illustrated in the accompanying drawings as follows:—

Fig. 1 shows a side elevation of a pump.

Fig. 2 a central vertical section on the line 2—2 of Fig. 3.

Fig. 3 a side elevation of the speed sensitive element.

Fig. 4 an enlarged section on the line 4—4 in Fig. 2.

Fig. 5 an enlarged section on the line 5—5 in Fig. 3.

Fig. 6 a section on the line 6—6 in Fig. 5.

Fig. 7 an enlarged view of the mounting of the centrifugal weights.

Fig. 8 an enlarged view of the unloader and a section of the speed sensitive element on the line 4—4 in Fig. 2.

Fig. 9 shows a common inlet unloader to which the device may be attached.

Fig. 10 a side elevation, partly in section, of the pilot valve.

Fig. 11 a section on the line 11—11 in Fig. 10.

1 marks the pump cylinder, 2 the crank shaft of the pump, 3 the drive wheel for the crank shaft, 4 the motor driving the pump, 5 a discharge passage from the pump, 6 a body of an unloader connected to the discharge pipe, 7 a discharge connection for the unloader and 8 a receiver pipe from the unloader. The unloader has the inlet chamber 9, discharge chamber 10, and unloader chamber 11. A passage 12 connects the inlet chamber 9 with the discharge chamber 10 and a seat 13 surrounds the passage 12. A valve 14 operates on this seat to close the passage. A passage 15 connects the inlet chamber with the unloader chamber. It is surrounded by a seat 16 on which an unloader valve 17 operates, the opening of this valve unloading the pump through a discharge passage 11ª. A plunger 18 carries the valve 17 and operates in a cylinder 19. A stem 20 carries the valve 14. This stem extends slidingly through the plunger 17 into a control chamber 21, the control chamber being connected with the cylinder 19 by a passage 21ª. This unloader is the subject matter of a companion application, unloader mechanism, Serial Number 519,164, filed Dec. 1st, 1921.

The speed sensitive element is mounted on a frame 22 carried by the pump cylinder. The speed controlling valve is actuated by the speed sensitive element and is provided with a body in which there is a controlling passage 24 leading by way of a pipe 25 to a pilot valve 26 for the unloader. The passage 24 has the ports 28 and 29 leading to an exhaust passage 34 and inlet 35, these passages being connected with the screw-threaded connections 36 and 37. A pipe 37ª extends from the receiver or discharge pipe 8 to the connection 37 so that this passage is subjected to receiver pressure. Valves 30 and 31 control the ports 28 and 29. Stems 32 and 33 extend from these valves respectively and are provided with the screw-threaded ends 38 which are screwed through the cross heads 39 and having screw-threads permitting the adjustment of the valves and this adjustment is locked by the jam nuts 40. Springs 41 extend from hooked ends 42 of the cross heads 39 to the perforated ears 43 on the body and tend to maintain the valve in closed position. Fingers 44 are secured on a rod 45, the rod sliding in an opening 46 in the body 23. A block 47 is secured to the end of the rod 45 and a pin 48 extends from the block 47 and is screw-threaded at 49 and screwed into a lever 50. The lever 50 is pivoted on the speed sensitive body 50ª. A push pin 51 rests against the lever 50 and extends into a sleeve 52, the sleeve being journaled in a bearing 53 in the speed sensitive element body. A pulley 54 is fixed on the sleeve 52. The pulley 54 is driven by the belt 55 extending to a pulley 56 on the crank shaft 2. The hub of this pulley has the carrier arms 57. Centrifugal weights 58 are pivoted on pins 59 in the arms 57 and are rotated with the pulley 54. The weights 58 have the inwardly extending arms 60 which engage the pin 61, the pin extending into the sleeve 53 and engaging an intermediate pin 62 resting on the thrust pin 51. A spring 63 is secured by a screw 64 in the frame 22 and a rod 65 is secured to the opposite end of the spring. It extends through the lever 50 and a nut 66 on the rod 65 communicates the pull of the spring to the lever. The centrifugal weights, it will be observed, form the centrifugal element, of this speed sensitive device and the spring 63 the centripetal element, or at least the major portion of the centripetal element.

The operation of the speed sensitive device is as follows: As the motor is started and the centrifugal weights are at their inner position under the influence of the centripetal element, the valves 30 and 31 are in closed position, or at least the inlet valve is closed. When the speed reaches the predetermined desired speed the centrifugal weights will have moved under the influence of centrifugal force sufficiently to move the lever 50 and with it the valve 31 to open the port 29 turning receiver pressure into the line. If this pressure is below the maximum pressure as hereinafter described, it will be immediately communicated to the unloader and the unloader valve closed throwing the load on the pump. When the speed falls below the predetermined speed the centripetal element acting on the lever 50 will move the rod 45 and with it the valves so as to close the inlet valve 31 and open the exhaust valve 30. Under these conditions air is exhausted from the unloader and the unloader is put in operation to unload the pump.

It is desirable to prevent frequent operations of the speed sensitive device and I, therefore, provide the following mechanism: The lever 50 has a V-shaped cam 67 at its end which engages a V-shaped cam 68 on a lever 69. The lever 69 is mounted on a pin 70 extending between the ears 71 on the frame 22. A rod 72 extends upwardly from the frame through the lever 69. A spring 73 engages the lever and a nut 74 is provided for adjusting the pressure of the spring. It will readily be observed that as the cam surfaces on the V-shaped cams are being moved from either extreme through the action of the centrifugal or centripetal elements they resist this movement and consequently add to the other element from that which is at the moment dominant and after they pass the point of the V's they assist the the element which is effecting the movement so that there is a range of speed that must be changed before the speed sensitive element will operate the valves. The real effect of this cam device is to vary the force of the centripetal element so as to vary the point at which the centrifugal element will operate the valves.

A pilot valve extends from the control chamber 21, the pilot valve 26 having a screw-threaded end which is screwed into the end of the chamber 21. The pilot valve has a control passage 76 communicating with the chamber 21, the ports 77 and 78 leading from the control passage to the inlet passage 79 and exhaust passage 80. The inlet connection 81 communicates with the inlet passage 79 and the pipe 25 from the speed responsive valve extends to the connection 81. An exhaust connection 82 communicates with the exhaust passage 80. A valve 83 controls the inlet port and a valve 84 the exhaust port, these valves having the stems 85 and 86 respectively. Cross heads 87 are secured to the ends of the valve stems. Springs 88 extend from the ends of the cross heads to the valve body and tend to keep the valves in closed position. Projections 89 engage the cross heads, these projections being carried by a yoke 90. The yoke 90 has an opening at one end into which one arm of a bell crank 92 extends. The bell crank is pivoted on a pin 93 and is connected by a link 94 with a lever 95. The lever 95 is pivoted on a pin 96. A diaphragm bearing plate 97 extends into a detent 97ª in the lever 95 and is mounted on a diaphragm 98. A diaphragm plate 99 is secured to the body 26 and a cover plate 100 is secured to the plate 99 securing a closing on the diaphragm 98. A passage 101 connects with the passage 79 so that the diaphragm is subjected to receiver pressure when the speed sensitive device has connected the receiver through the pipe 25 with the pilot valve. A screw-threaded extension 102 is arranged on the plate 100. A follower 103 is screwed into this extension and operates a counter-pressure spring 104, the counter pressure spring having a base plate 105 with a bearing point resting in a detent in the lever 95.

The operation of this pilot valve is as follows: After the speed sensitive device has turned the receiver pressure into the pilot valve and against the diaphragm 98, if this receiver pressure is above the desired pressure the lever 95 will be moved to the left, thus closing the inlet valve 83 and opening the exhaust valve 84. There will be no pressure, therefore, at the back of the plunger 18 and the face of the valve 17 will be subjected to receiver pressure. While the size of the plunger is larger than the face of the valve the differences in pressure will readily accomplish the opening of this valve. Further the stem 20 extending into the control chamber will be relieved of pressure at one end and subjected to pressure at the opposite end, the result being the closing of the valve 14. The pump will then operate in unloaded condition until the receiver pressure drops. This acting on the diaphragm 98 will close the valve 17 and load up the compressor or pump. It will be noted that the pilot valve will operate to unload and load up the compressor after it has adjusted its speed independently of the action of the speed sensitive device. This specific pilot valve is the subject matter of a companion application, Pressure controlled valve mechanism, Serial Number 519,163.

It is desirable to have some variation in the pressures at which the unloader will be made to operate both to prevent frequent reversals, a frequent unloading action, and also to prevent what is known as chattering of the valves. This is accomplished by providing a V-shaped cam 106 at the end of the lever 95 which is engaged by a V-shaped cam 107 on a lever 108. The lever 108 is pivotally mounted on the pin 109. A pin 110 extends from the cover plate 100 through the lever 108. A spring 111 is arranged around the pin 110 and rests against a nut 112 on the pin 110 exerting yielding pressure on the lever 108. With a movement of the lever in either direction from the extreme position the cam 107 resists the movement to an intermediate point and then assists the movement so that a reversal is resisted and a variation of pressure is necessary depending on the adjustment of the spring to effect an unloading or a loading up operation. By adjusting the nut 112 the range of the change may be varied.

The device readily lends itself to attachment for actuating the ordinary unloaders which are unloaded with the introduction of pressure as distinguished from the unloader shown in Fig. 8 which unloads with the exhaust of pressure. In Fig. 9 113 marks the inlet port to a compressor cylinder 114. The inlet valve 115 controls the inlet port. It is provided with a stem 116 and a spring 117 normally closes the inlet valve as the compressor or pump operates in the ordinary manner. A plunger 118 is arranged in the cylinder 119 and has a projection 120 extending forward in position to engage the rear of the stem 116 to hold the inlet valve 115 open when it is desired to unload. A spring 121 returns the plunger 118 when the pressure is relieved. When attached to the controlling mechanisms hereinbefore described the cylinder is connected by a pipe 122 with the control connection 76. The pilot valve or regulator has a passage 123 leading from the passage 80 to the diaphragm chamber. This passage is plugged when the device is operating on an unloader, unloading with the exhaust of pressure by a screw plug 124. With a reversal of the type of unloader this screw plug is placed in the passage 79 plugging this connection to the diaphragm. The pipe 37ª may be connected with the passage 80 so that receiver pressure may be on the diaphragm at all times and also with the passage 36. The control passage 24 is connected to the passage 79. With this connection at the starting of the motor and before it attains speed, assuming that the receiver pressure is below the desired pressure so that normally the compressor would be loaded up so far as the regulator control is concerned, the valve 83 will be open and the passage 79 being connected with the passage 24 the valve 30 will be open by reason of the preponderance of the centripetal element 63, thus putting receiver pressure by way of the valve 30, passage 24, passage 79, valve 83 and passage 76 on the unloader cylinder. If the receiver pressure is above the desired pressure so that the compressor would be unloaded under the normal operation of the compressor the valve 83 will be closed and the valve 84 open so that with the starting of the compressor the unloader will be under pressure by way of the valve 84 and consequently the compressor will start in an unloaded condition and will also continue unloaded after it gets to speed. When the compressor gets to speed the valves 30 and 31 are reversed, the valve 30 being closed and the valve 31 opened. The passage 35 leading to the passage 37 being open to the atmosphere a clear exhaust is provided whenever the valve 83 is opened by way of the passage 79 which is connected to the passage 24 and by way of the valve 35 and passage 37 to the atmosphere. It will be seen, therefore, that it is merely a matter of variation in the connection to arrange the device with an unloader in which pressure is used to unload as well as an unloader in which the exhaust of pressure brings about an unloading action.

What I claim as new is:—

1. In a motor load controlling device, the combination of a motor-driven mechanism; an unloader for the mechanism; a speed sensitive controlling device controlling the unloader comprising a centrifugal element, a lever on which the centrifugal element acts, a centripetal element acting on the lever; a V-shaped cam on the lever; a co-operating V-shaped cam opposing the V-shaped cam on the lever; and an adjustable spring actuating the co-operating V-shaped cam.

2. In a motor load controlling device, the combination of a motor-driven mechanism; a speed sensitive means controlling the load; and a pressure sensitive device controlled by the speed sensitive device and controlling the load.

3. In a motor load controlling device, the combination of a motor-driven mechanism; a speed sensitive means controlling the load; and a pressure sensitive device controlled by the speed sensitive device, said pressure sensitive device acting to vary the load independently of the speed sensitive means.

4. In a motor load controlling device, the combination of a motor-driven mechanism; an unloader for the mechanism; a pressure actuated pilot valve controlling the unloader; a controlling valve controlling the pressure on the pressure actuated pilot valve; and a speed sensitive means controlling the controlling valve.

In testimony whereof I have hereunto set my hand.

RUDOLPH CONRADER.